US009147136B2

(12) United States Patent
Shirotori

(10) Patent No.: US 9,147,136 B2
(45) Date of Patent: Sep. 29, 2015

(54) PRINT APPARATUS AND IMAGE DISPLAY METHOD

(71) Applicant: SEIKO EPSON CORPORATION, Tokyo (JP)

(72) Inventor: Hiroshi Shirotori, Nagano (JP)

(73) Assignee: Seiko Epson Corporation, Tokyo (JP)

(*) Notice: Subject to any disclaimer, the term of this patent is extended or adjusted under 35 U.S.C. 154(b) by 5 days.

(21) Appl. No.: 13/852,035

(22) Filed: Mar. 28, 2013

(65) Prior Publication Data

US 2013/0258410 A1 Oct. 3, 2013

(30) Foreign Application Priority Data

Mar. 28, 2012 (JP) .................. 2012-072744

(51) Int. Cl.
G06F 15/00 (2006.01)
G06K 15/02 (2006.01)
G03B 35/14 (2006.01)
G03B 35/24 (2006.01)
H04N 13/04 (2006.01)

(52) U.S. Cl.
CPC ............ G06K 15/02 (2013.01); G03B 35/14 (2013.01); G03B 35/24 (2013.01); H04N 13/0404 (2013.01); H04N 13/0447 (2013.01)

(58) Field of Classification Search
None
See application file for complete search history.

(56) References Cited

U.S. PATENT DOCUMENTS

| 2010/0182687 | A1* | 7/2010 | Yamazaki | 359/463 |
|---|---|---|---|---|
| 2011/0063421 | A1* | 3/2011 | Kubota | 348/52 |
| 2012/0019527 | A1* | 1/2012 | Ugawa | 345/419 |
| 2012/0200562 | A1* | 8/2012 | Kashiwagi et al. | 345/419 |
| 2012/0287504 | A1* | 11/2012 | Jang et al. | 359/463 |

FOREIGN PATENT DOCUMENTS

JP 2004-129186 A 4/2004

* cited by examiner

*Primary Examiner* — Rudolph Vincent
*Assistant Examiner* — Helen Q Zong
(74) *Attorney, Agent, or Firm* — Global IP Counselors, LLP

(57) ABSTRACT

To provide a display technique for presenting to a user a visual effect of an image obtained when printed onto a lenticular sheet in a state that more closely conforms to the actual circumstances, a print apparatus is provided with: an image creating means for creating a multi-viewpoint image formed by arranging side by side in sequential order image strips each created from a plurality of mutually different original images; a printing means for printing the multi-viewpoint image by forming side by side print dots made of a recording material on a lenticular sheet having a lenticular lens; and an image displaying means for displaying a simulation image simulating the multi-viewpoint image seen via the lenticular lens; the image displaying means displaying a simulation image visually reflective of cross-talk arising due to overlapping of the print dots at a boundary between the mutually adjacent image strips.

2 Claims, 6 Drawing Sheets

PRINT APPARATUS AND IMAGE DISPLAY METHOD

CROSS-REFERENCE TO RELATED APPLICATIONS

This application claims priority to Japanese Patent Application No. 2012-072744 filed on Mar. 28, 2012. The entire disclosure of Japanese Patent Application No. 2012-072744 is hereby incorporated herein by reference.

BACKGROUND

1. Technical Field

The present invention relates to a technique for creating a multi-viewpoint image from a plurality of original images and printing same onto a lenticular sheet.

2. Background Technology

One practically applied technique for stereoscopically representing an image makes use of binocular disparity. For example, with a lenticular image, image strips are cut from each of a plurality of original images that have been captured from mutually different points of view and are arranged side by side in sequential order depending on the arrangement of the point of view to create a composite image with parallax; by presenting this composite image via a lenticular lens, a parallax is created between the respective images that reach the left and right eyes, such that the subject appears to be three-dimensional. Also, with a lenticular image composited from a plurality of original images of entirely different content, it is possible to bring about a visual effect where the content of the image that appears varies depending on the viewing direction.

When such a lenticular image is being created, it is desirable to ascertain beforehand what visual effect will be obtained by printing, because lenticular sheets are costly and also because, depending on the quality of the original images, in some cases a proper visual effect can not be obtained. In view whereof, in, for example, a technique described in Patent Document 1, stripes of images created from original images to be composited are composited so as to be alternately arranged side by side and are displayed as a two-dimensional image, thereby making it possible for a user to recognize the final stereoscopic image.

Japanese Laid-open Patent Publication No. 2004-129186 (for example, FIG. 7) (Patent Document 1) is an example of the related art.

SUMMARY

Problems to be Solved by the Invention

However, there are different optical properties to lenticular sheets and displays or the like for displaying a screen, and thus a visual effect equivalent to the one that was confirmed on the screen is not necessarily also obtained in the printed result. This fact was not considered in the example of the related art described above, and thus it is possible for a problem to emerge in that an image printed onto a lenticular sheet can not be finished to the expected quality and the user can feel unsatisfied.

Several aspects of the invention resolve the foregoing problems and provide a display technique for presenting to a user a visual effect of an image obtained when printed onto a lenticular sheet in a state that more closely conforms to the actual circumstances.

Means Used to Solve the Above-Mentioned Problems

One aspect of the invention is a print apparatus including: an image creating means for creating a multi-viewpoint image formed by arranging side by side in sequential order image strips each created from a plurality of mutually different original images; a printing means for printing the multi-viewpoint image by forming side by side print dots made of a recording material on a lenticular sheet having a lenticular lens; and an image displaying means for displaying a simulation image simulating the multi-viewpoint image seen via the lenticular lens; the image displaying means displaying the simulation image visually reflective of cross-talk arising due to overlapping of the print dots at a boundary between the mutually adjacent image strips.

In a print apparatus that forms an image by forming print dots side by side, neighboring print dots are formed so as to slightly overlap with each other. In a single continuous image, this would not be so problematic, but in a multi-viewpoint image where image strips derived from different images are arranged side by side, the overlapping of print dots onto each other causes the boundary to be indistinct between adjacent image strips for which the boundary needs to be distinct, and this causes a degradation of image quality due to cross-talk. The problem of such description would not arise on a screen display in principle, and would first arise due to printing, which is problematic.

In view whereof, in the invention, the image displaying means displays simulation images reflective of the cross-talk arising due to overlapping of print dots that would occur when the multi-viewpoint image is printed onto a lenticular sheet. In so doing, degradation of image quality caused by cross-talk that could occur when the image is actually printed onto the lenticular sheet can be preemptively assessed. This makes it possible to preemptively minimize the wasteful consumption of lenticular sheets that takes place, for example, when an image based on a combination of original images not proper for a multi-viewpoint image is printed. Thus, according to the invention, the visual effect of an image that includes cross-talk that would be obtained when printed onto a lenticular sheet can be presented to the user in a state approximating reality.

In the invention, for example, the image displaying means can alternate over time the display of a plurality of simulation images each corresponding to a case where the multi-viewpoint image is viewed via the lenticular lens from a plurality of mutually different directions. In so doing, the simulation images that are displayed without actual printing being carried out allow the user to check the visual effect that is obtained when the image printed on the lenticular sheet is viewed from a variety of directions.

Also, for example, the image creating means can find the amount of cross-talk between image strips on the basis of the lens pitch of the lenticular lens and the diameter of print dots and the number of parallaxes in the multi-viewpoint image and create a simulation image reflective of the value thereof, to then be displayed by the image displaying means. With a multi-viewpoint image, a number of image strips commensurate with the number of parallaxes must be allocated within the lens pitch of the lenticular lens; essentially, a numerical value found by dividing the lens pitch by the number of parallaxes is allocated to the width of each of the image strips. When one or a plurality of print dots fit neatly within the scope of this width, there is little cross-talk, but otherwise in some cases considerable cross-talk can occur. This problem is especially prominent when the width of each of the image strips is small.

In this manner, the extent of cross-talk is largely decided by the lens pitch of the lenticular lens, the diameter of print dots, and the number of parallaxes of the multi-viewpoint image. As such, estimating the amount of cross-talk on the basis of such parameters and causing the simulation images to be reflective of the result thereof makes it possible to more suitably assess the image quality when printed into the lenticular sheet.

In such a case, for example, the image creating means can create a simulation image with at least partial superimposition between two strip images for two strip images between which cross-talk occurs. That cross-talk occurs means that a part of an image strip not originally meant to be seen appears when the multi-viewpoint image is viewed from a given angle via the lenticular lens. Representing same in the form of superimposed display of the strip images allows the user to more intuitively check for the occurrence of cross-talk.

Another aspect of the invention is an image display method including: an image acquisition step for acquiring a plurality of mutually different original images; an image creation step for creating a simulation image providing a mock representation of a visual effect of a case where the multi-viewpoint image, created from each of the plurality of original images, is printed onto a lenticular sheet having a lenticular lens; and a display step for displaying the simulation image; the image creation step including creating the simulation image visually reflective of cross-talk arising at a boundary between the mutually adjacent image strips due to overlapping of the print dots constituting the multi-viewpoint image on the lenticular sheet.

In the invention thus configured, similarly with respect to the invention of the print apparatus described above, the display of the simulation image makes it possible to present to the user the visual effect that arises when the multi-viewpoint image is printed onto the lenticular sheet. Similarly with respect to the invention of the print apparatus described above, the visual effect of an image that includes cross-talk that would be obtained when printed onto a lenticular sheet can thereby be presented to the user in a state approximating reality.

The image creation step of the image display method can also include, for example, finding the amount of cross-talk between image strips on the basis of the lens pitch of the lenticular lens and the diameter of print dots and the number of parallaxes in the multi-viewpoint image and creating a simulation image in which at least a part of adjacent image strips are superimposed. As stated above, these parameters have an impact on the magnitude of cross-talk, and estimating the amount of cross-talk from the values thereof and causing the simulation image to be reflective of same makes it possible to present to the user a simulation image enabling a more intuitive recognition of the occurrence of cross-talk.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
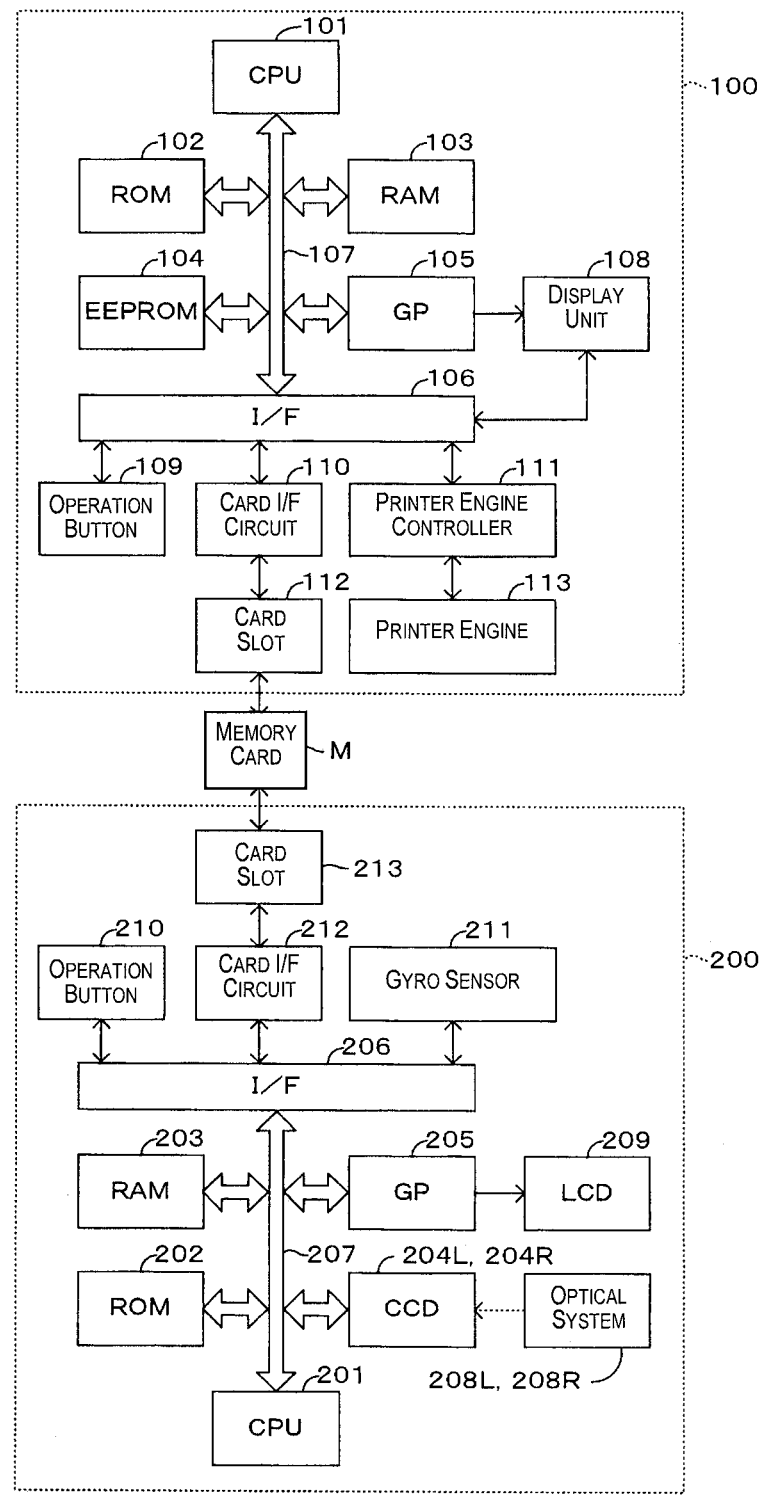
FIG. 1 is a drawing illustrating a print system in which one embodiment of a print apparatus as in the invention is used.

FIG. 1 is a drawing illustrating a print system in which one embodiment of a print apparatus as in the invention is used. The print system is for forwarding image data acquired by capturing an image using a digital camera 200 to a print apparatus 100 with a memory card M, or over a universal serial bus (USB) cable, or over a wireless local area network (LAN), and printing with the print apparatus 100. That is, assumed herein is so-called direct printing, in which a user captures an image with the digital camera 200 to generate image data, and the image data is read and printed by the print apparatus 100 without modification; however, print systems to which the invention can be applied are not limited thereto. In other words, the invention could also be applied to a print system for importing image data generated by the digital camera 200 to a personal computer, portable telephone, or the like and sending the image data from the personal computer to the print apparatus 100 to be printed. There is moreover no limitation to such a system that is provided with both the digital camera 200 and the print apparatus 100; rather, the invention can be applied in a general sense to image processing devices that carry out a variety of different processes on image data.

Within the digital camera 200, as illustrated in FIG. 1, a central processing unit (CPU) 201, a read-only memory (ROM) 202, a random access memory (RAM) 203, charge coupled devices (CCD) 204L, 204R, a graphic processor (GP) 205, and an interface (I/F) 206 are connected to each other via a bus 207, and information can be sent and received therebetween. The CPU 201 controls the digital camera 200 while also executing a variety of computational processes in accordance with a program that is stored in the ROM 202. Data that is temporarily needed at this time is stored in the RAM 203.

The CCDs 204L, 204R convert an optical image from a subject that has been collected by an optical system 208L, 208R to an electrical signal, which is then outputted. More specifically, an optical image collected by the optical system 208L is incident on the CCD 204L, while in turn an optical image collected by the optical system 208R is incident on the CCD 204R. The optical systems 208L, 208R are arranged so as to be spaced apart on the left and right in a chassis of the digital camera 200. More specifically, the optical system 208L is provided more to the left facing a subject at the front of the chassis of the digital camera 200, and the optical system 208R is provided more to the right facing the subject. For this reason, a parallax is created between the images captured by the CCDs 204L, 204R.

The optical systems 208L, 208R are constituted each of a plurality of lenses and an actuator, and form an optical image of the subject on a light-receiving surface of the CCD 204L, 204R, respectively, using the plurality of lenses while also adjusting the focus or the like using the actuator.

The digital camera 200 is able to selectively execute either a stereo imaging mode, in which a pair of images with parallax are captured using the two CCDs 204L, 204R, or a normal imaging mode, in which an image is captured using only one of the CCDs. A pair of sets of image data captured in the stereo imaging mode are saved in association with each other; in a process for creating a composite image for stereopsis (described below), the image captured by the CCD 204L and the image captured by the CCD 204R are applied as a left-eye original image and a right-eye original image, respectively.

Also, the GP 205 executes image processing for display on the basis of a display command supplied from the CPU 201; the resulting display image data is supplied to and displayed by a liquid crystal display (LCD) 209.

The I/F 206 is for providing an input/output functionality for the digital camera 200, and is a device for converting as appropriate the representation format of data when information is being sent and received between operation buttons 210, a gyro sensor 211, and a card I/F circuit 212. The operation buttons 210 connected to the I/F 206 include buttons for a power source, for switching modes, for a shutter, and the like, as well as an inputting means whereby a variety of different functions can be set, and enable the user to control and operate the digital camera 200 as desired. The gyro sensor 211 generates and outputs a signal indicative of the angle of a camera body (the angle relative to the horizontal plane) when the subject is imaged by the digital camera 200. The digital camera 200 generates a variety of forms of information during imaging (for example, information relating to the exposure, the subject, and the like), including the aforementioned angle of the camera body.

In the present embodiment, the digital camera 200 is given a structure capable of storing imaging information in exchangeable image file format (Exif) information and generating an image file to which the image data is attached. The structure of the Exif image file is itself essentially an ordinary Joint Photographic Experts Group (JPEG) image format, within which data such as a thumbnail image or imaging-related data is embedded in a form that conforms to the rules of the JPEG.

The card I/F circuit 212 is an interface for reading and writing information onto and from a memory card M that is inserted into a card slot 213. The I/F 206 also has a function for connecting to an external device, such as a USB or wireless LAN (not shown), making it possible to send and receive an image file to or from the print apparatus 100 over a wired or wireless connection.

The print apparatus 100 is an apparatus for printing an image that has been captured with the digital camera 200, and is configured as follows. In the print apparatus 100, a CPU 101, a ROM 102, a RAM 103, an electrically erasable and programmable ROM (EEPROM) 104, a GP 105, and an I/F 106 are connected to each other via a bus 107, and information can be sent and received therebetween. The CPU 101 controls each of the parts of the print apparatus 100 and also executes a variety of different computational processes, in accordance with programs that are stored in the ROM 102 and the EEPROM 104. A program or data intended to be executed by the CPU 101 is temporarily stored in the RAM 103, whereas the EEPROM 104 stores data that is retained even after the power source of the print apparatus has been disconnected. The CPU 101 also gives a display command to the GP 105 as needed; the GP 105 executes an image process for display in accordance with this display command, and the process result thereof is supplied to and displayed by a display unit 108.

The I/F 106 is a device for converting as appropriate the representation format of data when information is being sent and received between operation buttons 109, a card I/F circuit 110, and a printer engine controller 111. In the print apparatus 100, the operation buttons 109 are adapted to be pressed when a menu of the print apparatus 100 is to be selected or the like. The card I/F circuit 110 is connected to a card slot 112, and reads out an image file generated by the digital camera 200 from a memory card M that is inserted into the card slot 112. The I/F 106 also has a function for connecting to an external device, such as a USB or wireless LAN (not shown), making it possible to send and receive an image file to or from the digital camera 200 by wired communication or by wireless communication.

The display unit 108 has a touch panel provided to the surface of a display including, for example, an LCD, and in addition to displaying on the display the image data that is given from the GP 105, also outputs to the I/F 106 operation input data that is inputted to the touch panel by the user.

Upon accepting image data either via the memory card M or by data communication, the print apparatus 100 carries out a variety of processes, including processes illustrated below by way of example, by using the CPU 101, and also controls a printer engine 113 by using the printer engine controller 111 and thereby prints an image that corresponds to the image data. It would be possible to apply as the printer engine 113 one that forms an image by forming print dots made of a recording material side by side in a plurality of rows on a printed article in accordance with the image data; it would also be possible to use, for example, one that is of the inkjet format, in which droplets of ink serving as a recording material are ejected toward the printed article. The print format is not limited thereto, however.

The following describes a stereoscopic image print mode for creating a lenticular image by creating a composite image for stereopsis from image data corresponding to a left/right pair of original images captured in the stereo imaging mode of the digital camera 200, and printing the composite image for stereopsis onto a recording sheet that incorporates a lenticular lens.

A variety of other print operations that are also implemented in this type of printer can also be executed, but a variety of techniques known in the art exist for such print operations, and the same techniques can also be applied to the present embodiment, for which reason this specification omits a description thereof. The principles whereby a lenticular image makes stereopsis possible are also already known in the art, as are the principles of the fundamental method for creating such an image from a plurality of original images, and thus a description is herein omitted.

Figure 2:
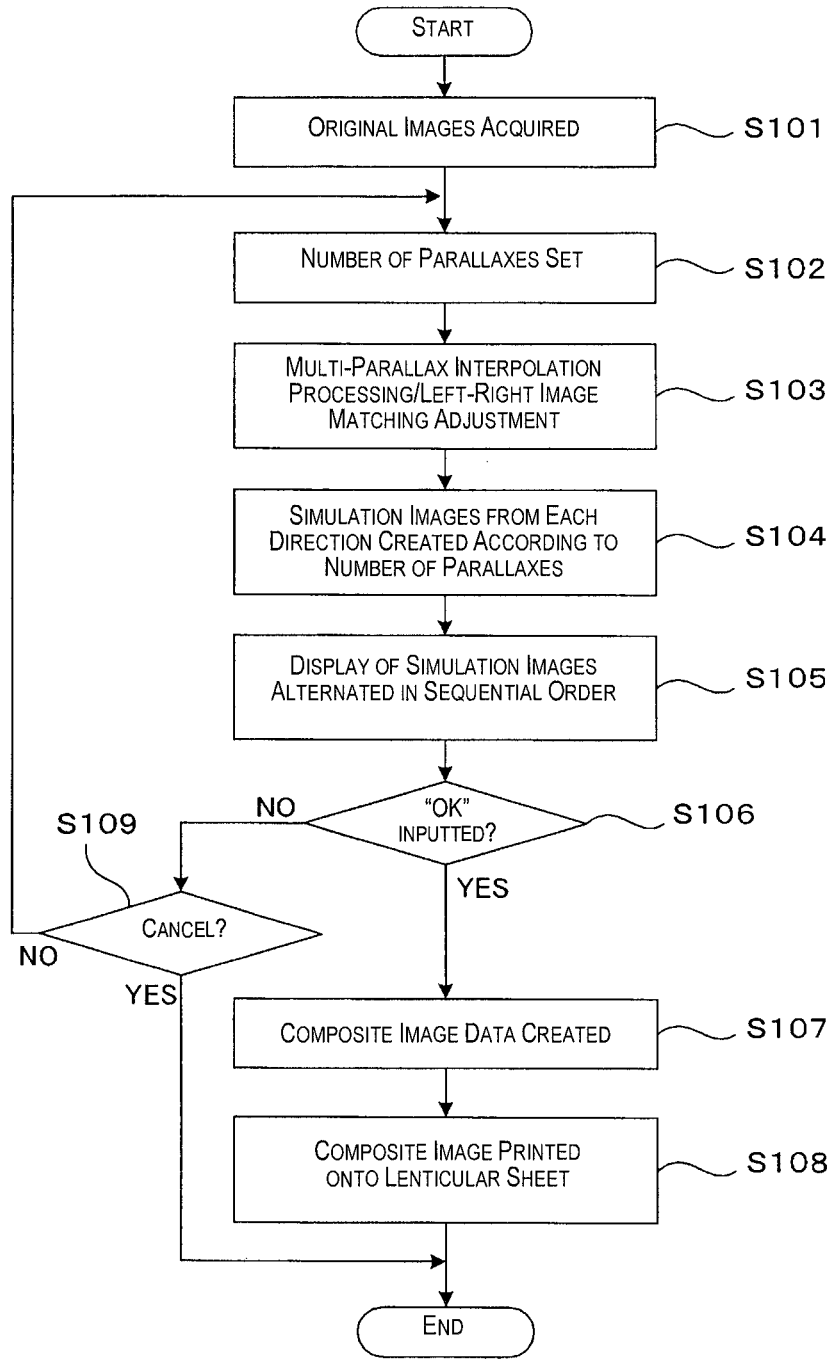
FIG. 2 is a flow chart illustrating a stereoscopic image print mode in the embodiment.
Figure 3A:
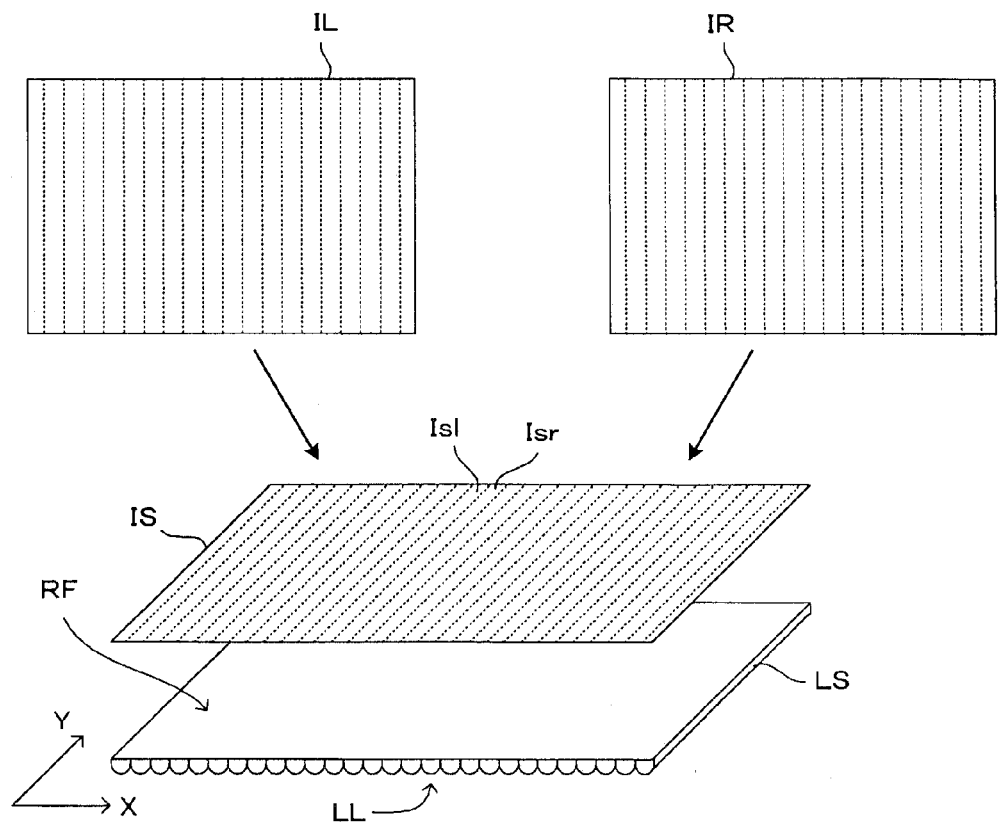
FIGS. 3A and 3B are drawings illustrating an example of a case for creating a stereoscopic image from original images.
Figure 3B:
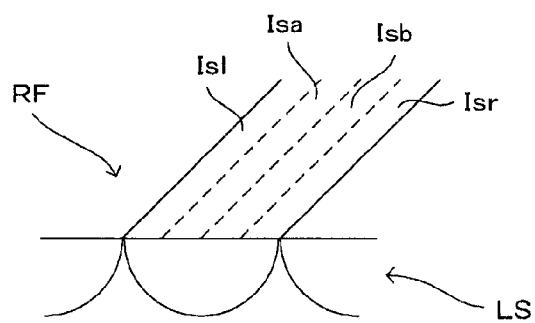

FIG. 2 is a flow chart illustrating the stereoscopic image print mode in the present embodiment. FIGS. 3A and 3B are drawings illustrating an example of a case for creating a stereoscopic image from original images. In the print mode, first, the original images that will serve as the basis of the stereoscopic image are acquired (step S101). The original images necessarily must be a plurality of images that have a parallax among each other; for example, the pair of images captured in the stereo imaging mode of the digital camera 200 described above could be used. The original images are not limited thereto, however, but rather it would also be possible to apply the technique described below to a set of a plurality of images obtained by imaging the same objected intended to be imaged from different points of view, or to a set of images created by, for example, computer graphics technology. The number of images that constitute one set of original images is two or more, as desired.

Described herein by way of example is a case where two images captured in the stereo imaging mode of the digital camera 200 are used. As illustrated in FIG. 3A, in the stereo imaging mode, two images IL, IR formed by imaging the same object intended to be imaged from slightly different points of view are obtained. The image IL is an image that is captured by the CCD 204L, which is arranged on the left side in the digital camera 200, and is used as an original image for a left-eye image in the process of creating the lenticular image. In turn, the image IR is an image that is captured by the CCD 204R, which is arranged further to the right than the CCD 204L, and is used as an original image for a right-eye image in the process of creating the lenticular image.

A composite image IS, which is created by alternately arranging side by side a plurality of image strips Isl, Isr that have been cut out from the original images IL, IR, is then printed onto a recording surface RF of a lenticular sheet LS having a lenticular lens LL (the recording surface being a main surface on the side opposite to the unevenness of the lenticular lens), whereby the lenticular image is obtained. Herein, the longitudinal direction of each of the convex lenses constituting the lenticular lens LL is understood be the Y direction, while the direction in which the convex lenses are disposed, orthogonal thereto, is understood to be the X direction. The image strips Isl, Isr are long, thin images that extend in the Y direction, which is the same as the longitudinal direction of the convex lenses.

Herein, the simplest form of lenticular image whereby stereopsis is possible is an image of a single point of view created from two original images, but the number of original images and the number of points of view are not limited thereto. For example, as illustrated in FIG. 3B, arranging side by side four image strips in a range of the recording surface RF that corresponds to the width of one convex lens L1 constituting the lenticular lens LL would make it possible to form an image of four points of view, i.e., an image for which there are four directions in which the composite image will appear to be three-dimensional when viewed via the lenticular lens LL. In such a case, it would also be possible to create the composite image by using four original images that have parallax among each other; it would further be possible to create a composite image of four parallaxes from fewer original images, e.g., from the two original images IL, IR.

In order to make this possible, the composite image should be created by arranging side by side, in sequential order, the image strips Isl, Isr obtained from the two original images, as well as image strips Isa, Isb created by either interpolating or extrapolating from these original images by image processing. FIG. 3B illustrates a case of interpolation. A variety of other combinations of number of original images and number of parallaxes are also conceivable, but the processes for creating the composite image corresponding to such combinations are known in the art, and thus a description is herein omitted.

Relating again to FIG. 2, the description of the operation of the stereoscopic image print mode shall now be continued. As stated above, a composite image of a different number of parallaxes than the number of original images can be created from the original images thus acquired, and the user is able to select as appropriate the number of parallaxes the composite image being created is to have. In view whereof, in the present embodiment, after the original images have been acquired, the user is prompted to input a setting for the desired number of parallaxes via, for example, the operation buttons 210 (step S102).

When the original images and the number of parallaxes are thus defined, a multi-parallax interpolation process for creating an interpolated image corresponding to the needed number of parallaxes from the original images is executed as needed, as is a matching adjustment process for adjusting the overlap position of left/right images (step S103). Advance preparation for creating the composite image is thereby completed.

Next, in advance of the creation of the composite image and the printing thereof, the user is prompted to check on an LCD screen the visual effect that is obtained by the composite image thus created. More specifically, simulation images that provide a mock representation of how the composite image thus created will appear when viewed from a given direction via the lenticular lens are created, the simulation images having mutually different images and being of the same number as the number of parallaxes (step S104). The display of the display unit 108 displays the simulation images in sequential order, while switching from one to the next at regular time intervals. So doing allows the user to have a mock experience of the visual effect of the lenticular image as seen from a variety of different directions and to check the workmanship thereof, as though the user were able to admire the image while also changing the tilt of the lenticular sheet. For this reason, it is possible to resolve user dissatisfaction where the visual effect of the image that is printed is not what was desired and a costly lenticular sheet is wasted.

Any desired fundamental principle of creating the simulation images can be applied; for example, it would be possible to use the one described in Patent Document 1 described above. Also, as regards a composite image of a large number of parallaxes, the simulation images can be created by, for example, alternately arranging side by side those image strips of the image strips constituting the composite image as would come into visual contact to a viewer's left eye and right eye when the lenticular image is viewed from a given direction. So long as the distance between the viewer's two eyes and the distance from the image are set as appropriate, the image strips that the viewer sees can be determined unambiguously on the basis of the various properties of the lenticular lens LL.

This manner of displaying on a two-dimensional display device (i.e., a display device that does not have a stereoscopic display functionality) an image that simulates the actual visual effect and prompting the user to check the workmanship in advance has been carried out, as is described in, for example, Patent Document 1. In the present embodiment, however, it is not that a simulation image where the image strips are merely arranged side by side in this manner is created, but rather the simulation images are reflective of a cross-talk that arises due to the overlap of images between the image strips that printing creates.

With a print format in which a plurality of print dots made from a recording material (for example, ink) are arranged side by side to form an image, neighboring print dots are incrementally arranged so as to be overlaid (overlapped) in order to obtain a smooth image. Because of this, commingling of colors or densities thereof causes the image to have blurring between neighboring dots. With a single continuous image, this contributes to the smoothness of the image, but with a lenticular image, which is formed by arranging side by side image strips that have been cut out from originally separate original images, the boundaries between neighboring image strips must be clearly distinct, and blurring of the image at such boundaries causes cross-talk. As will be described below, this becomes increasingly prominent as the number of parallaxes in the composite image increases.

A lenticular lens that has, for example, 60 to 100 lines per inch (lpi) in terms of the array pitch of the convex lenses has been put to practical use as the lenticular lens LL. With, for example, a 60-lpi product, the array pitch of the convex lenses (i.e., the width of the convex lenses in the X direction) is about 423 $\mu$m. A number of image strips commensurate with the number of parallaxes must be arranged within this width. However, a typical print dot diameter in, for example, an inkjet print apparatus is about several tens of μm. When, for example, this number is 50 μm, then there will be about eight print dots that are arranged side by side within this width, even in a case where overlapping of the dots has been eliminated. That is, when the number of parallaxes is about eight, the width of each of the image strips in the X direction will be about the same as the print dot diameter.

Figure 4A:
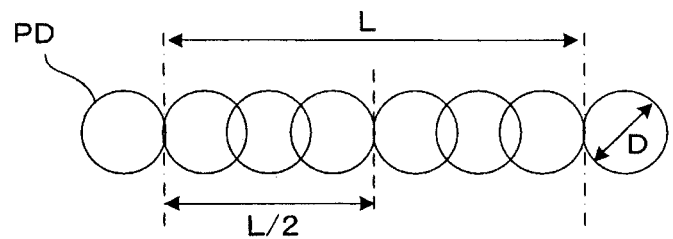
FIGS. 4A-4C are drawings illustrating the relationships between the width of image strips, the number of parallaxes, and the print dot diameter.
Figure 4B:
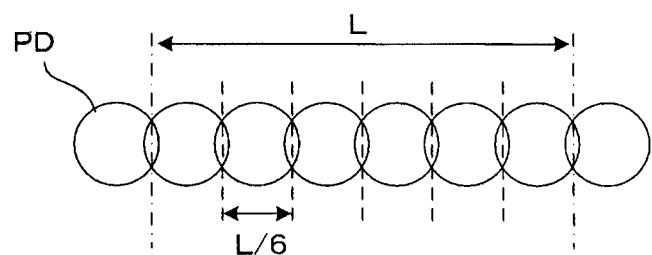
Figure 4C:
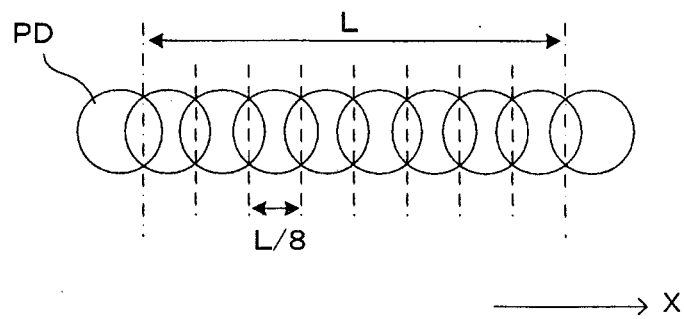

FIGS. 4A-4C are drawings illustrating the relationships between the width of the image strips, the number of parallaxes, and the print dot diameter. FIG. 4A is an example of an image where two image strips have been allocated to a width L of a convex lens in the X direction, i.e., of an image of two parallaxes. In such a case, the width of one image strip is at most L/2. In the present example, three print dots PD of a dot diameter D are arrayed with respect to one image strip, and yet overlapping of the print dots PD straddling the boundary between the image strips can be avoided.

The examples illustrated in FIGS. 4B and 4C, however, are images of six parallaxes and of eight parallaxes, in which six image strips and eight image strips, respectively, have been allocated to the width L of a convex lens. In these examples, in a case where the same number of image strips as the number of parallaxes are formed with respect to the width L of a convex lens, the width of each of the image strips will be L/6 or L/8, respectively, and when the width becomes less than the dot diameter D, this inevitably results in overlapping of the print dots PD that straddle the boundaries of the image strips. Also, the extent of this overlapping is increasingly prominent as the number of parallaxes increases.

Blurring of the image between neighboring image strips thus is one cause of cross-talk. That is, when such a composite image is viewed from a given direction via the lenticular lens LL, a degradation of the visual effect occurs in that an image that was not originally meant to be seen will partially appear, in that the image is blurred or appears to be a double-image, and so forth. Such a phenomenon will appear for the first time when the image has been printed onto the lenticular sheet, and cannot be recognized with a simulation display on a screen that mimics the view from a variety of directions merely by changing the manner in which the image strips are arranged side by side.

In view whereof, in the present embodiment, the amount of cross-talk arising due to overlapping of the print dots is estimated from information such as an optical parameter of the lenticular lens, the width of the image strips, the set number of parallaxes, and the print dot diameter, and, in a case where cross-talk takes place, then simulation images whereby the displayed image would be reflective thereof are created and displayed. So doing makes it possible to present to the user the degradation of the visual effect caused by the cross-talk in advance and request a confirmation. For the user, in a case where it is found that the desired visual effect is not obtained, then selections such as adjusting the number of parallaxes or canceling the print can be made, and the problem where a lenticular sheet is wastefully consumed can be avoided in advance.

In such a case, it suffices for the simulation images to provide the user with a certain extent of sensory confirmation of the degradation of image quality caused by cross-talk, and the simulation images do not necessarily need to provide an accurate representation of the amount of cross-talk. For example, displaying an image where image strips in which cross-talk takes place are superimposed onto each other would allow the user to intuitively ascertain that cross-talk would occur. By way of example of a method, in the present embodiment, a "cross-talk margin" is defined as per the following from a variety of numerical parameters that are involved in lenticular images, and the amount of cross-talk is estimated by the value thereof and reflected in the simulation images.

Figure 5:
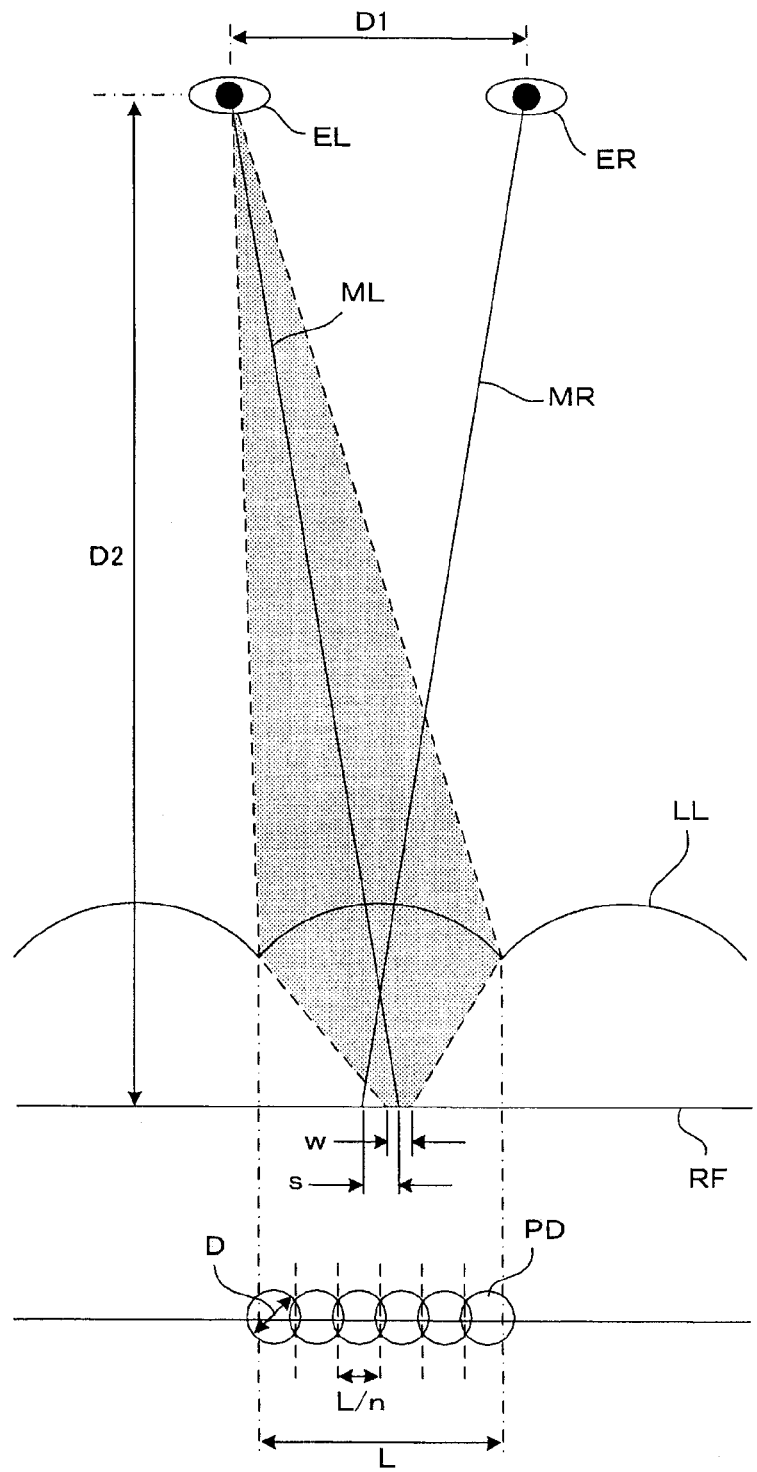
FIG. 5 is a drawing describing a definition of a cross-talk margin in the embodiment.

FIG. 5 is a drawing describing the definition of a cross-talk margin in the present embodiment. As illustrated in FIG. 5, "L" is the lens pitch of the lenticular lens LL, "n" is the number of points of view of a multi-viewpoint image, and "D" is the print dot diameter. Further, "s" is the interval on the recording surface RF of principal rays ML, MR between one convex lens and the left or right eye EL, ER, respectively, and "w" is the focal line width when one convex lens is viewed from each eye. Herein, the cross-talk margin in a case where there are an even number of points of view is defined by the following formula:

$$e = L/n + L/2n - D/2 - (s+w)/2$$

When the cross-talk margin e is 0 or greater, the degradation of image quality caused by cross-talk is at a substantially problem-free level. As the value e increases in the negative direction, however, the degradation of image quality caused by cross-talk becomes increasingly more prominent.

For example, to apply the properties of a typical commercially available lenticular sheet, the lens pitch L is about 423 μm in a lenticular lens LL where the number of convex lenses is 60 lpi. When the binocular distance D1 is 65 mm and the distance D2 from the binocular position to the recording surface RF is 400 mm, then the principal ray interval s and the focal line width w are 76 μm and 46 μm, respectively. When the print dot diameter for the inkjet format is 80 μm, the formula above gives a value of (+4.8) μm for the cross-talk margin e when, for example, the number of points of view n=6, and the cross-talk is at a substantially problem-free level. When the number of points of view n=8, however, the value of the cross-talk margin e is (−21.6) μm, and the degradation of image quality caused by the cross-talk is prominent. The method for causing the simulation images to be reflective of such a degradation of image quality caused by cross-talk could be, for example, the one illustrated below by way of example.

Figure 6:
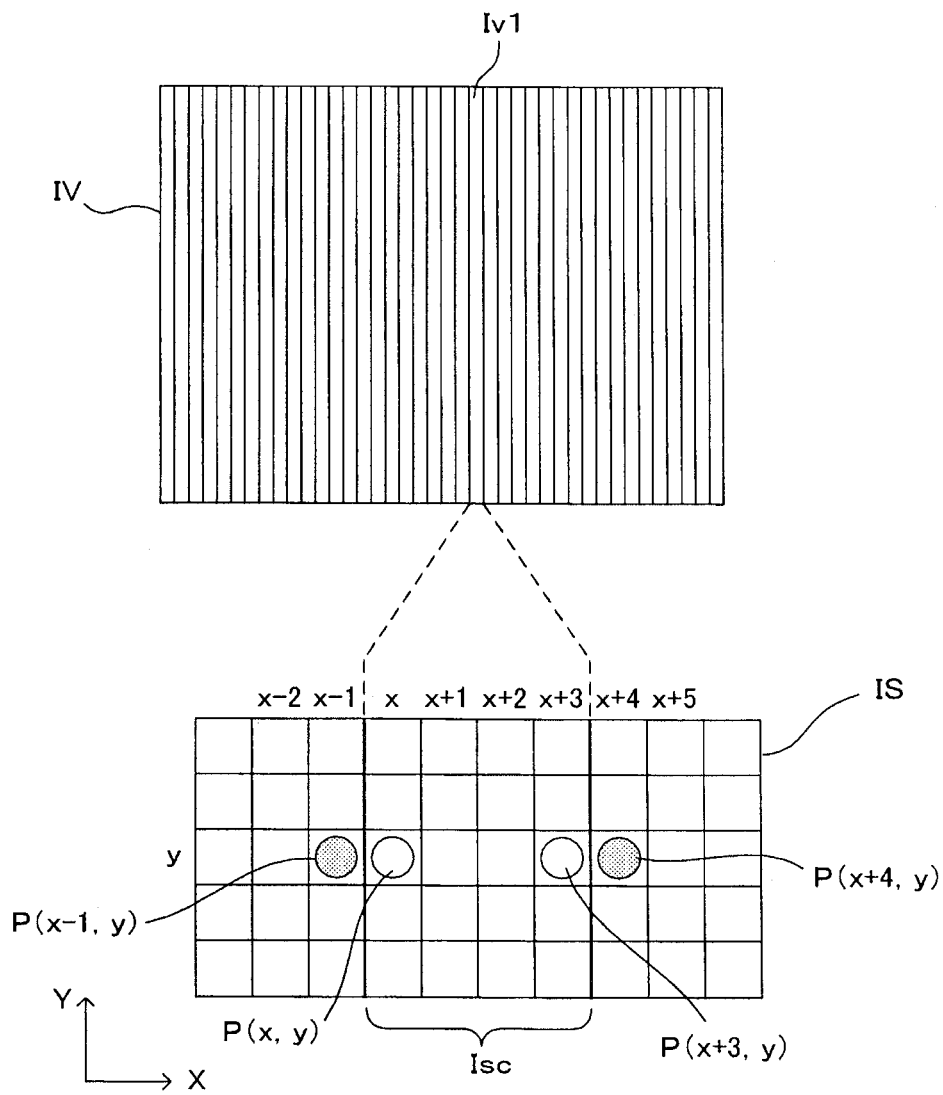
FIG. 6 is a drawing illustrating one example of the principles of creating a simulation image.

FIG. 6 is a drawing illustrating one example of the principles of creating a simulation image. As stated above, a simulation image that is equivalent to when the lenticular image is viewed from a given direction can fundamentally be created by arranging side by side those image strips, of the image strips included in the composite image to be printed onto the lenticular sheet, that would be seen in the relevant direction. As illustrated in FIG. 6, a single image strip Iv1 constituting a simulation image IV is based on an image strip Isc having a width of four pixels, from where the X coordinate value is x until where the X coordinate value is (X+3), within the composite image IS. The "pixels" mentioned herein are a concept that is derived from the resolution of the image data, and are not necessarily consistent with the number of pixels in the image displayed on the display unit 108 or with the number of dots in the image that is to be printed onto the lenticular sheet LS.

In a case where no consideration is given to the effects of cross-talk, the pixel values within the image strip Isc in the composite image IS should be the corresponding pixel values of the image strip Iv1 in the simulation image IV, without modification. In a case where cross-talk is to be reflected, however, then of the pixels constituting the image strip Isc in the composite image IS, the pixel value of a pixel P(x, y) located at a boundary with another neighboring image strip is replaced with a value found from the pixel value of the relevant pixel P(x, y) as well as from the pixel value of a pixel P(x−1, y) of the other image strip neighboring same, thus making the image strip Iv1 in the simulation image IV.

For example, the pixel value of the pixel P(x, y) can be replaced by the mean value of the pixel values of the two pixels P(x, y) and P(x−1, y). The pixel value can also be replaced by a value found by taking a weighted average of the pixel values of the two pixels, depending on the size of the cross-talk margin e found as per the foregoing.

A pixel P(x+3, y) in contact with the boundary on the side opposite thereto, as well, is replaced with a value found from the pixel value of the relevant pixel and the pixel value of a pixel P(x+4, y) in the other image strip neighboring same. The same is also true of the Y coordinate direction, for all coordinate values y.

In so doing, with the image strip Iv1 constituting the simulation image IV, when cross-talk is anticipated to take place in the printed image, then an image component of a different image strip, which originally did not appear in the boundary portion with the other image strip, will be mixed in. For this reason, an image such that a different image strip has been partially superimposed onto the one image strip will be displayed. This "different image strip" is the image strip that neighbors on the relevant image strip on the composite image IS, but is not necessarily the neighboring image strip on the simulation image IV. Because of this, for the user, it will appear as though cross-talk has taken place on the simulation image IV. That is, a mock representation of cross-talk is produced on the simulation image IV, as would take place in the printed image.

This makes it possible for the user to check in advance for whether or not the effects of cross-talk would appear in the printed image. In a case where it is desired for the simulation images IV to be more reflective of the magnitude of the cross-talk amount, either the ratio of pixel values for the adjacent pixels included in the pixel values to be replaced as per the foregoing are altered in accordance with the value of the cross-talk margin, or the range of pixel values where the pixel values are to be replaced is increased or decreased in accordance with the value of the cross-talk margin.

Relating again to FIG. 2, the description of the operation of the stereoscopic image print mode shall now be continued. By creating the simulation images as seen from a variety of directions on the basis of the foregoing principles (step S104) and displaying same in sequential order (step S105), the user is able to check the visual effect of the image when printed onto the lenticular sheet LS. When an operation indicative of authorization (OK) is inputted from the user for this result ("YES" in step S106), image data corresponding to the composite image IS is created from the current image data (step S107), and an image based thereon is printed onto the lenticular sheet LS, thus finishing the process (step S108).

However, when the user does not approve the simulation result ("NO" in step S106), i.e., when the user has decided that the desired visual effect is not obtained, the user is prompted to select whether to continue or cancel the print task (step S109); when continuation is selected, the flow returns to step S102, the number of parallaxes is re-set, and the foregoing process is repeated. When cancellation is selected, the process is ended without printing being carried out.

As per the foregoing, in the present embodiment, the simulation images producing a mock display of the visual effect that will be viewed via the lenticular lens are created and displayed on the screen in advance of the printing of the composite image created from the plurality of original images on the lenticular sheet. This makes it possible for the use to carry out printing having already checked the image quality, thus avoiding wasteful consumption of a lenticular sheet without obtaining the desired visual effect.

In such cases, the simulation images are reflective of the cross-talk that arises due to overlapping of the print dots when the image is printed on the lenticular sheet. For this reason, it is possible to preemptively assess the degradation of image quality, which could not be checked without carrying out actual printing, thus achieving a greater convenience for the user.

As was described above, the print apparatus 100 in the print system of the present embodiment is equivalent to a "print apparatus" of the invention. Also, the CPU 101 functions as an "image creating means" of the invention, while the printer engine 113 functions as a "printing means" of the invention. The display unit 108 functions as an "image displaying means" of the invention.

Of the steps in each of the processes in FIG. 2, step S101 is equivalent to an "image acquisition step" of the invention, and steps S104 and S105 are equivalent to an "image creation step" and "display step", respectively, of the invention.

The invention is however in no way limited to the embodiment described above, and a variety of modifications are possible beyond what is described above, provided that there is no departure from the essence of the invention. For example, in the embodiment described above, the concepts of the invention were applied to the operation of a stereo print mode for printing an image whereby stereopsis is possible from original images that are captured in a stereo imaging mode. However, visual effects using a lenticular sheet also include motion effects, changing effects, and the like in addition thereto, and these, too, similarly suffer the problem of cross-talk. It would thus also be possible to apply the concepts of the invention to creating an image for obtaining such effects.

Also, for example, in the embodiment described above, the display of the image strips was partially superimposed in cross-talk to thereby make it easier to intuitively recognize the occurrence of cross-talk, but in the sense that it should at least be possible to check whether or not there is degradation due to cross-talk, instead of the foregoing, for example, the user can be alerted to the occurrence of cross-talk by an effect such as where a portion where cross-talk occurs is displayed as a solid of a specific color or is displayed in a blinking manner within the simulation images.

Also, in the embodiment described above, an image display method as in the invention was implemented in the print apparatus 100 constituting the print system together with the digital camera 200, but the applications of the invention are not limited thereto. For example, it would also be possible to implement a similar image display method in a stand-alone digital camera or printer, a portable terminal device, a personal computer, or the like. When the image display method of the invention is implemented in a device lacking a print function, printing can be carried out by transferring to a print apparatus an image that has been checked for visual effect, as stated above.

What is claimed is:

1. An image display method for representing simulated visual results via a lenticular lens relative to a composite image constituted by images at a plurality of points of view, the image display method comprising:
acquiring a plurality of images at mutually different points of view;
creating a simulation image by modifying a value of a pixel that is located at an end portion of an image strip constituting an image of a predetermined point of view; and displaying the simulation image on a displaying unit that does not have the lenticular lens, the creating of the simulation image including creating the simulation image by modifying each a pixel value of the end portion of the image strip and a pixel value of an adjacent end portion of an adjacent image strip with an average value of the pixel value of the end portion and the pixel value of the adjacent end portion, the adjacent image strip being adjacent to the image strip in the composite image, the adjacent end portion being adjacent to the end portion in the composite image.

2. The image display method as set forth in claim 1, wherein the displaying includes alternating the displaying from the simulation image of the predetermined point of view to the simulation image of a point of view adjacent to the predetermined point of view.

\* \* \* \* \*